(12) United States Patent
Matsumoto et al.

(10) Patent No.: US 9,811,230 B2
(45) Date of Patent: Nov. 7, 2017

(54) TOUCH PANEL AND PRODUCTION METHOD THEREOF

(71) Applicant: Japan Aviation Electronics Industry, Limited, Tokyo (JP)

(72) Inventors: Kenji Matsumoto, Tokyo (JP); Tsutomu Ohgushi, Tokyo (JP); Tsuyoshi Takiguchi, Tokyo (JP); Joji Akizuki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 226 days.

(21) Appl. No.: 14/715,055

(22) Filed: May 18, 2015

(65) Prior Publication Data
US 2015/0338977 A1  Nov. 26, 2015

(30) Foreign Application Priority Data
May 26, 2014 (JP) ................................. 2014-108165

(51) Int. Cl.
*G06F 3/047* (2006.01)
*G06F 3/044* (2006.01)

(52) U.S. Cl.
CPC .............. *G06F 3/047* (2013.01); *G06F 3/044* (2013.01); *G06F 2203/04103* (2013.01); *Y10T 29/49163* (2015.01)

(58) Field of Classification Search
CPC . G06F 2203/04101; G06F 2203/04111; G06F 2203/04112; G06F 2203/04113; G06F 3/041; G06F 3/0412; G06F 3/044; G06F 3/047
See application file for complete search history.

(56) References Cited

U.S. PATENT DOCUMENTS

2012/0274602 A1* 11/2012 Bita ..................... G02B 26/001
                                                            345/174
2013/0106747 A1* 5/2013 Choi ....................... G06F 3/041
                                                            345/173

FOREIGN PATENT DOCUMENTS

JP        2013-117816 A    6/2013

* cited by examiner

*Primary Examiner* — Kent Chang
*Assistant Examiner* — Scott Au
(74) *Attorney, Agent, or Firm* — Muncy, Geissler, Olds & Lowe, P.C.

(57) ABSTRACT

A touch panel includes first sensor electrode arrays in which first island-shaped electrode portions are arrayed along a first direction and connected through connecting portions, second sensor electrode arrays in which second island-shaped electrode portions are arrayed at intervals along a second direction, jumper wiring portions being superimposed through insulating portions and connecting the second island-shaped electrode portions arranged adjacent to each other along the second direction, and a lead-out wiring portion connected to the first and second sensor electrode arrays, the first and second sensor electrode arrays being formed of a first transparent conductor layer having a first thickness, the jumper wiring portions being formed of a second transparent conductor layer having a second thickness, the lead-out wiring portion being formed of a third transparent conductor layer having a third thickness that is larger than the first thickness.

13 Claims, 6 Drawing Sheets

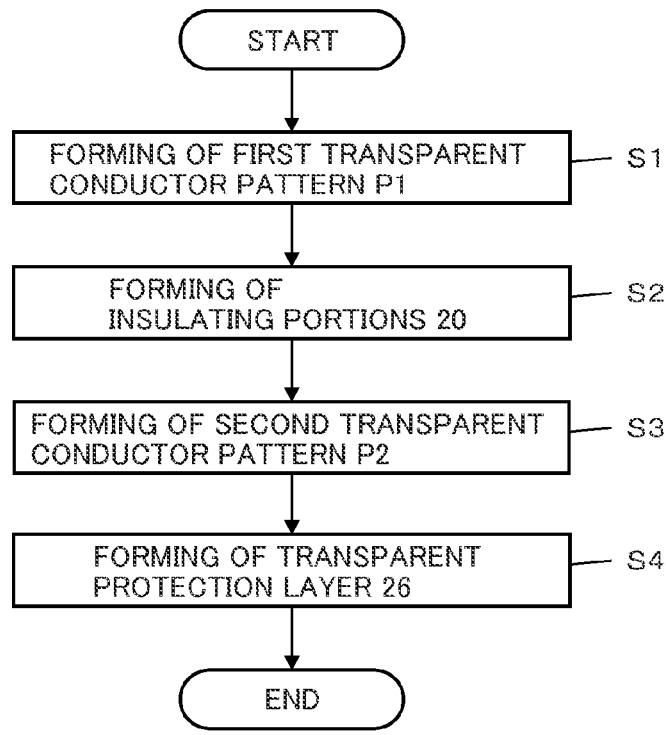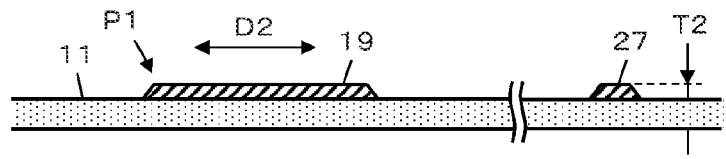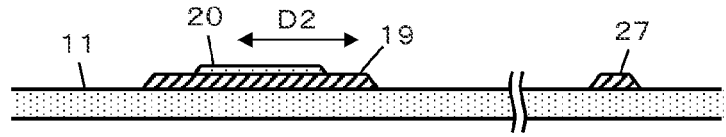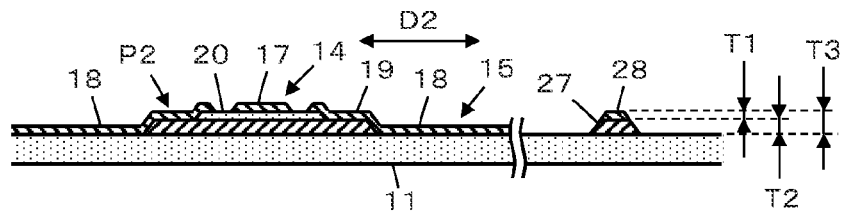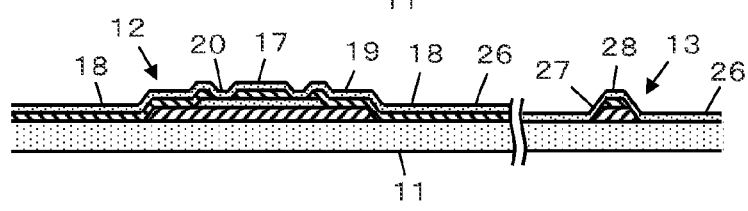

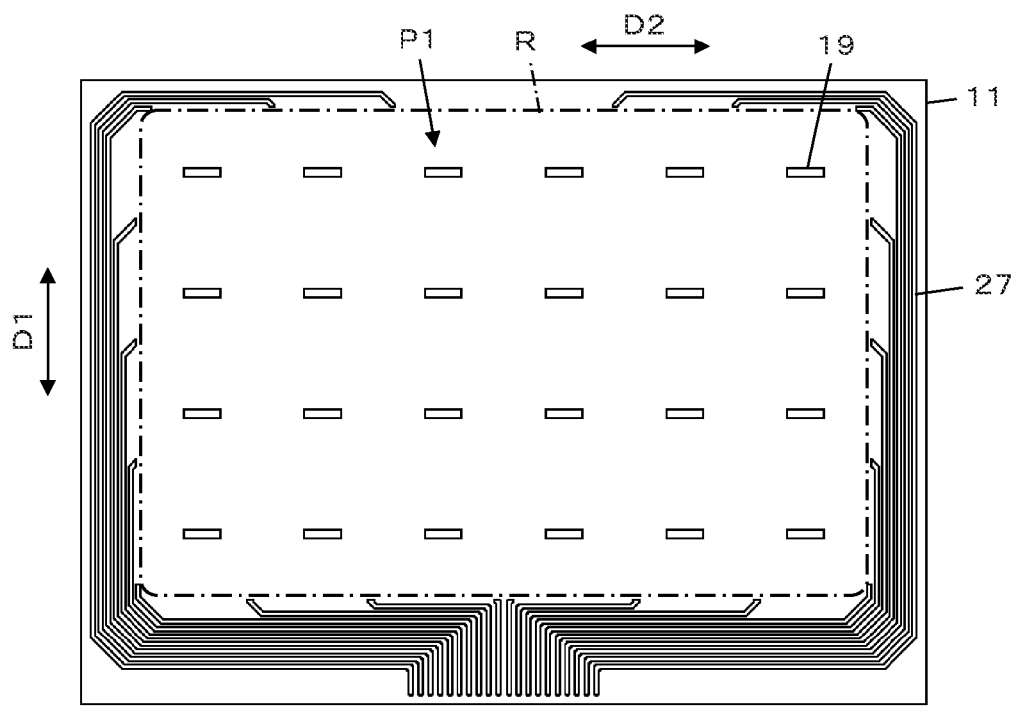
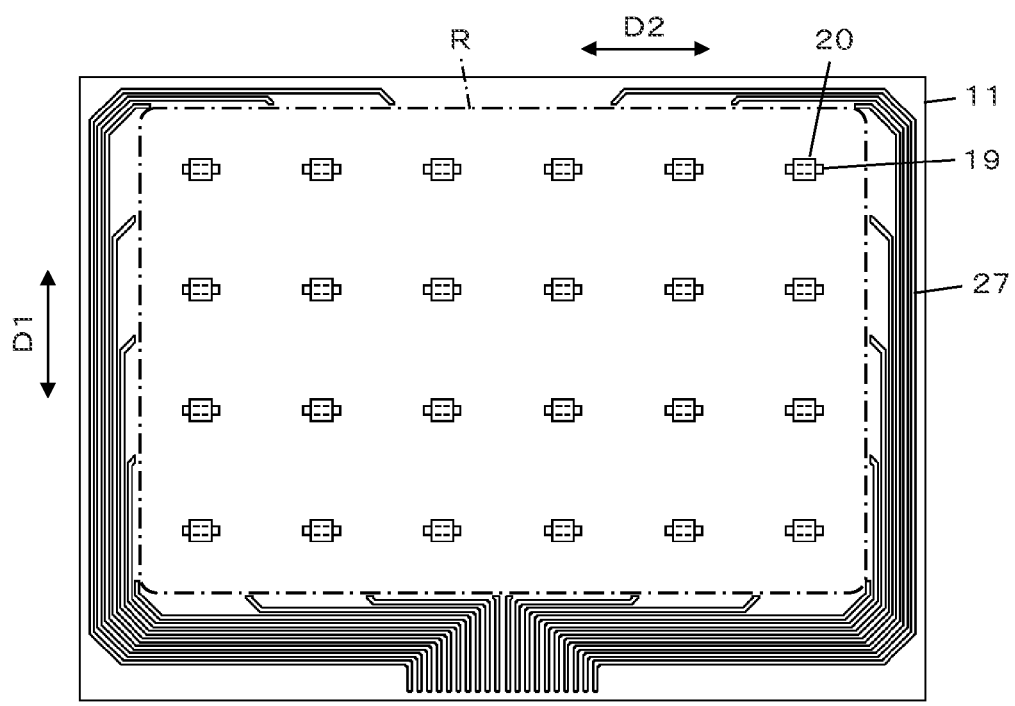

TOUCH PANEL AND PRODUCTION METHOD THEREOF

BACKGROUND OF THE INVENTION

The present invention relates to a touch panel and a production method thereof, in particular, to a configuration and a production method of a capacitive touch panel.

Recently, the use of a touch panel which is used in combination with a display device such as a liquid crystal display device for an input operation to an electronic device through contact with a screen has been spreading in various electronic devices including portable information equipment, vending machines, automated teller machines and gaming devices.

The touch panel is categorized into several types including resistive film type, capacitive type, infrared type, ultrasonic type and electromagnetic-induction coupling type, depending on the operating principle thereof. Among those, the touch panel of the capacitive type having a high transmittance and excellent durability has been particularly attracting attention.

An example of the touch panel as illustrated in FIG. 12 is disclosed by JP 2013-117816 A. The touch panel includes a plurality of first sensor electrode arrays 2 extending along a first direction D1 and arranged parallel to one another in a second direction D2 that crosses the first direction D1, and a plurality of second sensor electrode arrays 3 extending along the second direction D2 and arranged parallel to one another in the first direction D1 on a transparent substrate 1. Each of the first sensor electrode arrays 2 is consisted of a plurality of rhombic island-shaped electrode portions 5 connected to one another along the first direction D1 through linear portions 4, and each of the second sensor electrode arrays 3 is consisted of a plurality of rhombic island-shaped electrode portions 7 connected to one another along the second direction D2 through bridge portions 6. Having the linear portions 4 respectively superimposed on the bridge portions 6 with a distance therebetween in the thickness direction of the transparent substrate 1, the first sensor electrode arrays 2 and the second sensor electrode arrays 3 cross each other in a non-contact state. The first sensor electrode arrays 2 and the second sensor electrode arrays 3 are made of a transparent conductor and are arranged in an active area A on the transparent substrate 1.

An end of a lead-out wiring portion 8 is connected to an end of each of the first sensor electrode arrays 2, and another end of the lead-out wiring portion 8 extends to an edge portion of the transparent substrate 1 to be connected to a terminal 8A. Similarly, an end of a lead-out wiring portion 9 is connected to an end of each of the second sensor electrode arrays 3, and another end of the lead-out wiring portion 9 extends to another edge portion of the transparent substrate 1 to be connected to a terminal 9A. The lead-out wiring portions 8 and 9 are formed of a metal having an excellent conductivity so as to keep the electric resistance value low, and are arranged in a non-active area B outside of the active area A.

In addition, surfaces of the active area A and the non-active area B are covered by a transparent protection layer 10.

The touch panel of JP 2013-117816 A is used as being superimposed on a screen of a display device. An image is displayed by the display device through the plurality of first sensor electrode arrays 2 and the plurality of second sensor electrode arrays 3 that are formed of a transparent conductor and arranged in the active area A. When an arbitrary portion on the protection layer 10 in the active area A is touched, change in capacitance at the portion is detected through the lead-out wiring portions 8 and 9, whereby it becomes possible to detect the touched position, to switch between on and off, and the like.

The lead-out wiring portions 8 and 9 however are formed of a metal and thus cannot transmit light. Hence, in general, the non-active area B where the lead-out wiring portions 8 and 9 are arranged cannot be used as a display region and is masked.

Accordingly, when a display device is designed such that an entire screen thereof is the active area A of a touch panel, the touch panel becomes larger than the screen of the display device by the portion of the non-active area B around the active area A. In addition, when a touch panel of the same size as that of the screen of the display device is disposed, the display region of the display device in use has to be limited by the portion of the non-active area B.

In particular, screens of recent electronic devices have been increasing in size. When the active area A is enlarged to increase the screen size while the sizes of the respective island-shaped electrodes 5 and 7 are maintained, i.e., the sensitivity of the touch panel is maintained, the number of island-shaped electrodes has to be increased, thereby requiring a greater number of lead-out wiring portions 8 and 9. As a result, the non-active area B becomes larger, increasing the influence of masking the non-active area B.

If, when the first sensor electrode arrays 2 and the second sensor electrode arrays 3 are formed on the transparent substrate 1, the lead-out wiring portions 8 and 9 are simultaneously formed by using the same transparent conductor as that forming the first sensor electrode arrays 2 and the second sensor electrode arrays 3, the lead-out wiring portions 8 and 9 are made to be transparent, whereby need of masking the non-active area B is removed. Since a typical material used for the transparent electrode such as Indium Tin Oxide (ITO) however has a higher electric resistivity than a metal wiring, it would become difficult to sensitively detect a change in capacitance.

SUMMARY OF THE INVENTION

The present invention has been made to solve the above-described problem and aims at providing a touch panel in which a region where a lead-out wiring portion is arranged does not need to be masked and which can sensitively detect a change in capacitance.

In addition, the present invention also aims at providing a method of producing the touch panel. A touch panel according to the present invention comprises: a transparent substrate; one or more sensor electrode portions formed on a surface of the transparent substrate; and one or more lead-out wiring portions formed around the sensor electrode portion on the surface of the transparent substrate and connected to the sensor electrode portion, wherein the sensor electrode portion includes:

a plurality of first sensor electrode arrays in each of which a plurality of first island-shaped electrode portions are arrayed along a first direction and connected through connecting portions, the plurality of first sensor electrode arrays being arranged parallel to one another along a second direction that crosses the first direction;

a plurality of second sensor electrode arrays in each of which a plurality of second island-shaped electrode portions are arrayed at intervals along the second direction, the plurality of second sensor electrode arrays being arranged parallel to one another along the first direction; and a plurality of jumper wiring portions which are arranged such that the plurality of jumper wiring portions and the corresponding connecting portions are superimposed through insulating portions, the plurality of jumper wiring portions electrically connecting the second island-shaped electrode portions arranged adjacent to each other along the second direction, wherein the lead-out wiring portion includes:

a plurality of first wiring portions connected to the plurality of first sensor electrode arrays of the sensor electrode portion, respectively; and a plurality of second wiring portions connected to the plurality of second sensor electrode arrays of the sensor electrode portion, respectively, wherein the plurality of first sensor electrode arrays and the plurality of second sensor electrode arrays of the sensor electrode portion are formed of a first transparent conductor layer having a first thickness, wherein the plurality of jumper wiring portions of the sensor electrode portion are formed of a second transparent conductor layer having a second thickness, and wherein the lead-out wiring portion is formed of a third transparent conductor layer having a third thickness that is larger than the first thickness.

A touch panel production method according to present invention comprises:

a first pattern forming step of forming a first transparent conductor pattern including the plurality of jumper wiring portions and a first lead-out wiring layer having a pattern shape of the lead-out wiring portion on the transparent substrate;

a second pattern forming step of forming a second transparent conductor pattern including the plurality of first sensor electrode arrays, the plurality of second sensor electrode arrays and a second lead-out wiring layer having a pattern shape of the lead-out wiring portion on the transparent substrate; and an insulating portion forming step of forming the insulating portions to insulate the jumper wiring portions and the connecting portions from each other, the jumper wiring portions and the connecting portions being superimposed, wherein the first pattern forming step, the second pattern forming step and the insulating portion forming step are performed such that the jumper wiring portions and the connecting portions are superimposed through the insulating portions and that the first lead-out wiring layer and the second lead-out wiring layer are superimposed, whereby the second island-shaped electrode portions that are adjacent to each other along the second direction are electrically connected by the jumper wiring portions to form the sensor electrode portion, and the first lead-out wiring layer and the second lead-out wiring layer are superimposed to form the lead-out wiring portion.

BRIEF DESCRIPTION OF THE DRAWINGS

FIG. 3 is a flowchart illustrating a method of producing the touch panel according to Embodiment 1.

FIGS. 4A to 4D are cross sectional views of the main part of the touch panel according to Embodiment 1 in respective steps of the production method thereof.

FIG. 5 is a plan view of a first transparent conductor pattern formed on a transparent substrate.

FIG. 6 is a plan view of the first transparent conductor pattern in which insulating portions are formed on jumper wiring portions.

DETAILED DESCRIPTION OF THE INVENTION

Embodiments of the present invention will be described below based on the appended drawings.

Embodiment 1

Figure 1:
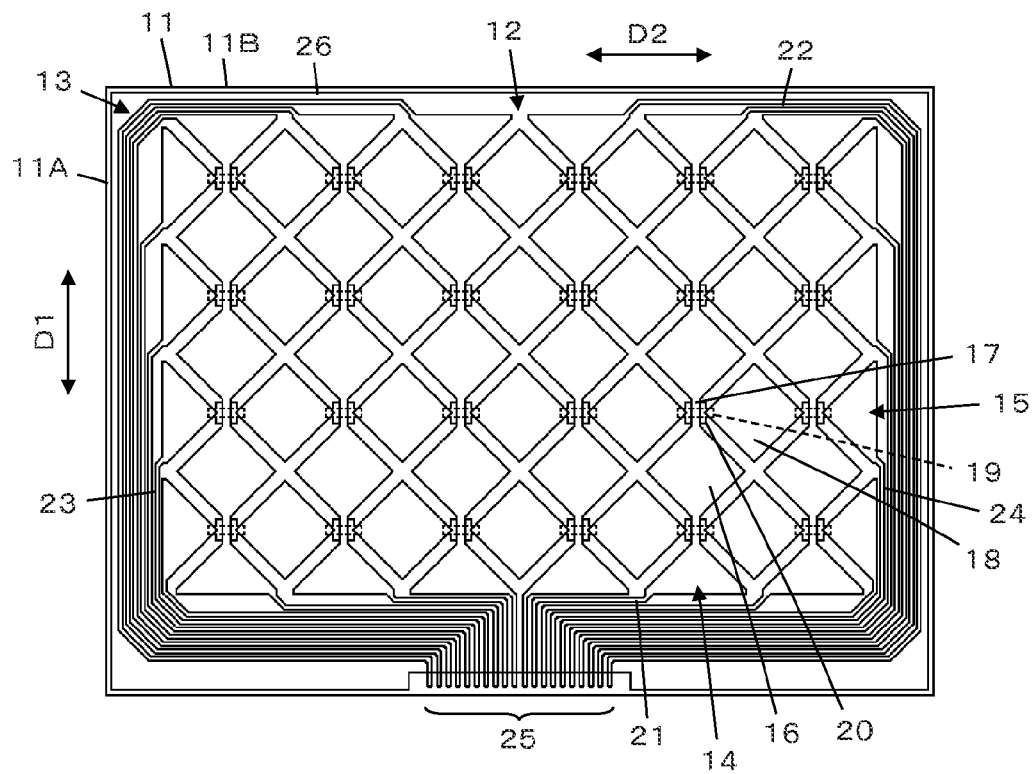
FIG. 1 is a plan view of a touch panel according to Embodiment 1 of the present invention.

FIG. 1 illustrates a configuration of a touch panel according to Embodiment 1 of the present invention. The touch panel includes a transparent substrate 11 having a rectangular shape, a sensor electrode portion 12 formed on a surface of the transparent substrate 11, and a lead-out wiring portion 13 formed around the sensor electrode portion 12 on the surface of the transparent substrate 11.

The sensor electrode portion 12 includes a plurality of first sensor electrode arrays 14, extending along a first direction D1 and arranged parallel to one another along a second direction D2, and a plurality of second sensor electrode arrays 15, extending along the second direction D2 and arranged parallel to one another along the first direction D1, the first direction D1 being in parallel with a short side portion 11A of the rectangular transparent substrate 11, whereas the second direction D2 being in parallel with a long side portion 11B of the transparent substrate 11, i.e., orthogonal to the first direction D1. The first sensor electrode arrays 14 and the second sensor electrode arrays 15 are formed of a first transparent conductor layer made of indium tin oxide (ITO) having a predetermined first thickness T1.

Each of the first sensor electrode arrays 14 comprises a plurality of first island-shaped electrode portions 16 linearly arranged along the first direction D1, and a plurality of linear connecting portions 17 each disposed between two of the first island-shaped electrode portions 16 that are adjacent to each other along the first direction D1. While each of the first island-shaped electrode portions 16 except for those located at both ends of the first sensor electrode array 14 has a rhombic shape, each of the first island-shaped electrode portions 16 located at both ends of the first sensor electrode array 14 has an isosceles triangle shape which is a bisection of the rhombic shape. Each of the connecting portions 17 is integrally connected to corners of the adjacent first island-shaped electrode portions 16, whereby the plurality of first island-shaped electrode portions 16 in each of the first sensor electrode arrays 14 are electrically connected through the connecting portions 17.

Meanwhile, each of the second sensor electrode arrays 15 comprises a plurality of second island-shaped electrode portions 18 linearly arranged along the second direction D2 at predetermined intervals. While each of the second island-shaped electrode portions 18 except for those located at both ends the second sensor electrode array 15 has a rhombic shape, each of the second island-shaped electrode portions 18 located at both ends of the second sensor electrode array 15 has an isosceles triangle shape which is a bisection of the rhombic shape.

The sensor electrode portion 12 further includes a plurality of jumper wiring portions 19 formed on the surface of the transparent substrate 11 such that each of the jumper wiring portions 19 is disposed between two adjacent second island-shaped electrode portions 18 in the second sensor electrode array 15. The jumper wiring portions 19 are formed of a second transparent conductor layer made of indium tin oxide having a second thickness T2 that is larger than the first thickness T1 of the first transparent conductor layer forming the first sensor electrode arrays 14 and the second sensor electrode arrays 15, and are in contact with corners of the adjacent second island-shaped electrode portions 18 to thereby electrically connect the adjacent second island-shaped electrode portions 18. The second island-shaped electrode portions 18 in each of the second sensor electrode arrays 15 are electrically connected through the jumper wiring portions 19 in this manner.

The jumper wiring portions 19 are arranged so as to be superimposed on the corresponding connecting portions 17 of the first sensor electrode arrays 14. An insulating portion 20 formed of a transparent insulator is disposed between each of the jumper wiring portions 19 and the corresponding connecting portion 17, thereby electrically insulating the superimposing jumper wiring portion 19 and the connecting portion 17 from each other. Hence, the first sensor electrode arrays 14 extending along the first direction D1 cross the second sensor electrode arrays 15 extending along the second direction D2 in such a manner that the first sensor electrode arrays 14 are electrically isolated from the second sensor electrode arrays 15.

The lead-out wiring portion 13 arranged around the sensor electrode portion 12 is formed of a third transparent conductor layer made of indium tin oxide having a third thickness T3 that is larger than the second thickness T2 of the second transparent conductor layer forming the jumper wiring portions 19, and includes a pair of first wiring portions 21 and 22 respectively connected to opposite ends of each of the first sensor electrode arrays 14 extending along the direction D1 and a pair of second wiring portions 23 and 24 respectively connected to opposite ends of each of the second sensor electrode arrays 15 extending along the second direction D2.

The first wiring portions 21 and 22 as well as the second wiring portions 23 and 24 all run over the surface of the portion of the transparent substrate 11 around the sensor electrode portion 12 to reach a terminal region 25 disposed at the center of one of two long side portions 11B.

In addition, the sensor electrode portion 12 and the lead-out wiring portion 13, except a part of the lead-out wiring portion 13 in the terminal region 25, are covered by a transparent protection layer 26 made of an insulating resin or the like.

Figure 2:
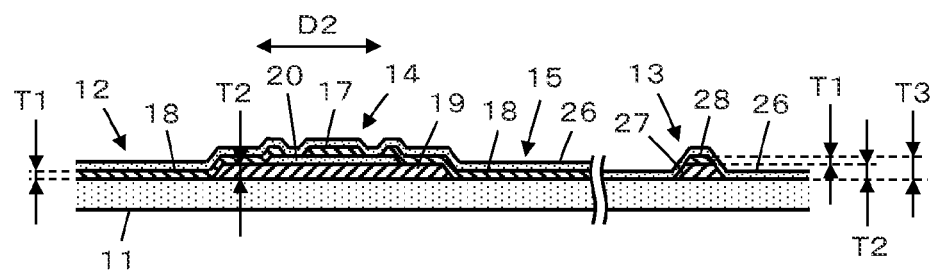
FIG. 2 is a cross sectional view of the main part of the touch panel according to Embodiment 1.

FIG. 2 illustrates a cross-sectional configuration of an intersection of the first sensor electrode array 14 and the second sensor electrode array 15 in the sensor electrode portion 12 together with one line of wiring in the lead-out wiring portion 13.

Each of the jumper wiring portions 19 is formed on the transparent substrate 11 at the intersection of the first sensor electrode array 14 and the second sensor electrode array 15, and each of the connecting portions 17 of the first sensor electrode array 14 is formed above the center part of the jumper wiring portion 19 through the insulating portion 20, while the second island-shaped electrode portions 18 are formed on the transparent substrate 11 and on the jumper wiring portions 19 such that corners of a pair of the second island-shaped electrode portions 18 facing each other with a distance in the second sensor electrode array 15 respectively overlay two end portions of each of the jumper wiring portions 19. In addition, over exposed parts of the connecting portions 17, the insulating portions 20 and the second island-shaped electrode portions 18, the transparent protection layer 26 is formed.

As illustrated in FIG. 2, the connecting portions 17 that are part of the first sensor electrode arrays 14 and the second island-shaped electrode portions 18 of the second sensor electrode arrays 15 are formed of the first transparent conductor layer in common and thus both have the first thickness T1, whereas the second transparent conductor layer forming the jumper wiring portions 19 has the second thickness T2 that is larger than the first thickness T1 of the first transparent conductor layer.

The first wiring portions 21 and 22 and the second wiring portions 23 and 24 all in the lead-out wiring portion 13 have a same cross-sectional configuration and each have a two-layer structure of a first lead-out wiring layer 27 and a second lead-out wiring layer 28, the first lead-out wiring layer 27 comprising a transparent conductor layer with the second thickness T2 that is same as the thickness of the second transparent conductor layer formed on the surface of the transparent substrate 11 and constituting the jumper wiring portions 19, and the second lead-out wiring layer 28 comprising a transparent conductor layer with the first thickness T1 that is same as the thickness of the first transparent conductor layer constituting the first sensor electrode arrays 14 and the second sensor electrode arrays 15. That is, the third thickness T3 of the third transparent conductor layer constituting the lead-out wiring portion 13 has a value equivalent to a sum of the first thickness T1 of the first transparent conductor layer and the second thickness T2 of the second transparent conductor layer.

Over the lead-out wiring portion 13, the transparent protection layer 26 is formed.

Since the lead-out wiring portion 13 is formed of the third transparent conductor layer made of indium tin oxide and thus can transmit light, there is no need to mask the region of the lead-out wiring portion 13 by means of masking or the like, enabling to realize a touch panel of which the entire surface is transparent.

In addition, since the third transparent conductor layer constituting the lead-out wiring portion 13 has the third thickness T3 that is thicker than the first transparent conductor layer constituting the first sensor electrode arrays 14 and the second sensor electrode arrays 15 in the sensor electrode portion 12, each of the wiring portions can obtain a large cross-sectional area. Accordingly, even the wiring portion formed using indium tin oxide that has the higher electric resistivity than a metal can lower its electric resistance and enables sensitive detection of a change in capacitance in the sensor electrode portion 12.

Specifically, when the respective wiring portions of the lead-out wiring portion 13 that are exposed to the outside in the terminal region 25 are connected to an integrated circuit or the like which is not shown in the drawing, changes in capacitance occurring in certain portions in the sensor electrode portion 12 can be detected, whereby it becomes possible to detect a contact position on the touch panel and to switch between on and off.

Moreover, compared to a metal wiring used in a conventional touch panel, indium tin oxide used in the touch panel according to Embodiment 1 has an excellent corrosion resistance, and thus reliability can be improved.

Next, a production method of the touch panel according to Embodiment 1 is described with reference to a flowchart in FIG. 3.

First, in Step S1, a first transparent conductor pattern P1 that is made of indium tin oxide and includes the plurality of jumper wiring portions 19 and the first lead-out wiring layer 27 having a pattern shape of the lead-out wiring portion 13, is formed on the transparent substrate 11. The first transparent conductor pattern P1 has the second thickness T2 as illustrated in FIG. 4A. As a result of forming the first transparent conductor pattern P1, as illustrated in FIG. 5, the jumper wiring portions 19 are scatteringly formed on the transparent substrate 11 in a region R where the sensor electrode portion 12 is to be formed, while the first lead-out wiring layer 27 for forming the lead-out wiring portion 13 is formed around the region R. The jumper wiring portions 19 are formed of the second transparent conductor layer made of indium tin oxide that constitutes the first transparent conductor pattern P1.

In Step S2, the insulating portions 20 are formed over the jumper wiring portions 19. In this step, as illustrated in FIG. 4B and FIG. 6, the insulating portions 20 are formed over the jumper wiring portions 19, respectively, such that each of the insulating portions 20 runs across the center part of the corresponding jumper wiring portion 19 along the first direction D1, with both ends of the jumper wiring portion 19 along the second direction D2 exposed.

Figure 7:
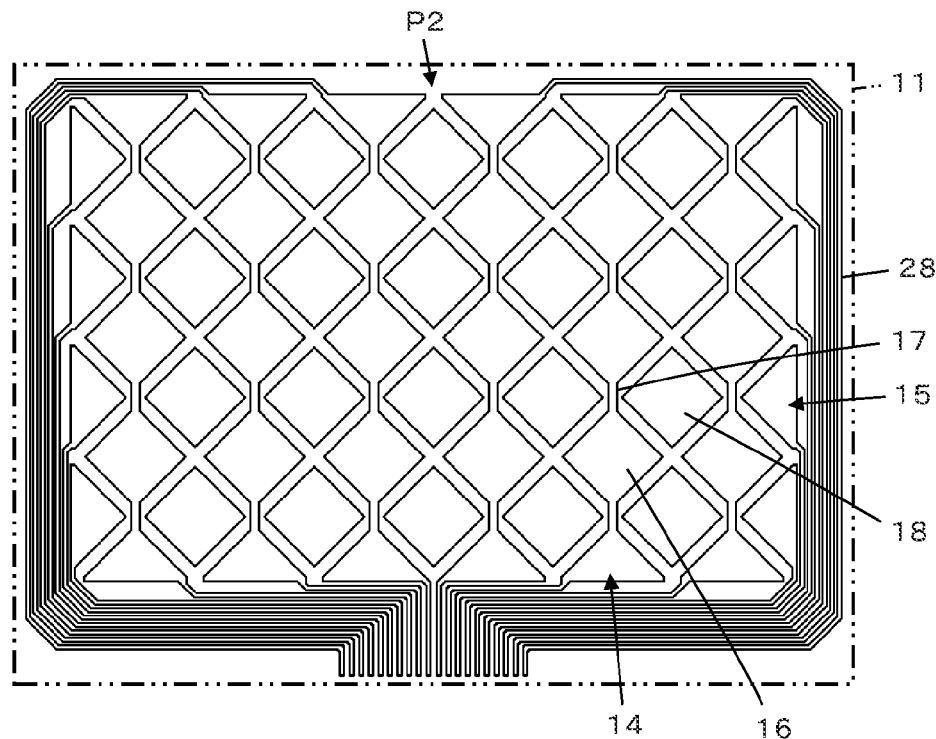
FIG. 7 is a plan view of a second transparent conductor pattern.

In Step S3, as illustrated in FIG. 7, a second transparent conductor pattern P2 that is made of indium tin oxide and includes the first sensor electrode arrays 14, the second sensor electrode arrays 15 and the second lead-out wiring layer 28 having a pattern shape of the lead-out wiring portion 13, is formed. In this process, as illustrated in FIG. 4C, the second transparent conductor pattern P2 is formed such that each of the connecting portions 17 of the first sensor electrode array 14 is superimposed on the insulating portion 20 that covers the center part of the corresponding jumper wiring portion 19 and that the second lead-out wiring layer 28 is superimposed on the first lead-out wiring layer 27.

As a result of formation of the second transparent conductor pattern P2, at an intersection of the first sensor electrode array 14 and the second sensor electrode array 15, corners of a pair of the second island-shaped electrode portions 18 facing each other with a distance in the second sensor electrode array 15 come in contact with upper parts of both ends of the corresponding jumper wiring portion 19, whereby the pair of island-shaped electrode portions 18 are electrically connected to each other through the jumper wiring portion 19. The sensor electrode portion 12 is formed in this manner. In the first sensor electrode arrays 14 and the second sensor electrode arrays 15, the first transparent conductor layer made of indium tin oxide constituting the second transparent conductor pattern P2 is formed.

The second transparent conductor pattern P2 has the first thickness T1, and the second lead-out wiring layer 28 is superimposed on the first lead-out wiring layer 27, whereby the third transparent conductor layer having the third thickness T3 which is equivalent to a sum of the first thickness T1 and the second thickness T2 is formed. The lead-out wiring portion 13 is formed of the third transparent conductor layer.

Then, in Step S4, as illustrated in FIG. 4D, the transparent protection layer 26 is formed so as to cover the sensor electrode portion 12 and the lead-out wiring portion 13. In this process, the transparent protection layer 26 covers entire surfaces of the sensor electrode portion 12 and the lead-out wiring portion 13 except the terminal region 25 such that only a part of the lead-out wiring portion 13 in the terminal region 25 shown in FIG. 1 is exposed.

The touch panel according to Embodiment 1 as illustrated in FIG. 1 is thus produced.

The first transparent conductor pattern P1 having the second thickness T2 is formed to thereby form the jumper wiring portions 19 and the first lead-out wiring layer 27, and thereafter the second transparent conductor pattern P2 having the first thickness T1 is formed to thereby form the first sensor electrode arrays 14, the second sensor electrode arrays 15 and the second lead-out wiring layer 28. Accordingly, the lead-out wiring portion 13 having a two-layer structure in which the second lead-out wiring layer 28 is superimposed on the first lead-out wiring layer 27 and which has the third thickness T3 is obtained.

Compared to a conventional touch panel having a metal wiring, the touch panel of the present invention eliminates the process of forming a meal wiring and thus can reduce the production cost.

The first transparent conductor pattern P1, the insulating portions 20, the second transparent conductor pattern P2 and the transparent protection layer 26 can be all formed through the photolithography technique.

In addition, although the first transparent conductor layer constituting the first sensor electrode arrays 14 and the second sensor electrode arrays 15, the second transparent conductor layer constituting the jumper wiring portions 19 and the third transparent conductor layer constituting the lead-out wiring portion 13 are all made of indium tin oxide, this is not the sole case and they can be made of a transparent metal oxide such as aluminum-doped zinc oxide (AZO) and indium zinc oxide (IZO).

Moreover, the number of first island-shaped electrode portions 16 in the first sensor electrode arrays 14 and the number of second island-shaped electrode portions 18 in the second sensor electrode arrays 15 shown in FIG. 1 are merely examples and are not limited thereto.

Furthermore, while the direction D1 along which the first sensor electrode arrays 14 of the sensor electrode portion 12 extend and the direction D2 along which the second sensor electrode arrays 15 of the sensor electrode portion 12 extend orthogonally cross each other, this is not the sole case, and the directions can vary as long as they cross each other.

In the sensor electrode portion 12 in the touch panel according to the above-described Embodiment 1, the jumper wiring portions 19 are formed on the surface of the transparent substrate 11, and the connecting portions 17 of the first sensor electrode arrays 14 are respectively formed on the jumper wiring portions 19 through the insulating portions 20. Reversely, the sensor electrode portion 12 can be constituted such that the connecting portions 17 of the first sensor electrode arrays 14 are formed on the surface of the transparent substrate 11, and the jumper wiring portions 19 are respectively formed on the connecting portions 17 through the insulating portions 20.

In this case, referring to the flowchart in FIG. 3, the step S3 first takes place to form the second transparent conductor pattern P2 including the first sensor electrode arrays 14, the second sensor electrode arrays 15 and the second lead-out wiring layer 28 having the pattern shape of the lead-out wiring portion 13, the step S2 thereafter takes place to form the insulating portions 20 on the connecting portions 17, and the step S1 takes place to form the first transparent conductor pattern P1 including the jumper wiring portions 19 and the first lead-out wiring layer 27 having the pattern shape of the lead-out wiring portion 13. The touch panel can be also produced in this manner.

Embodiment 2

Figure 8:
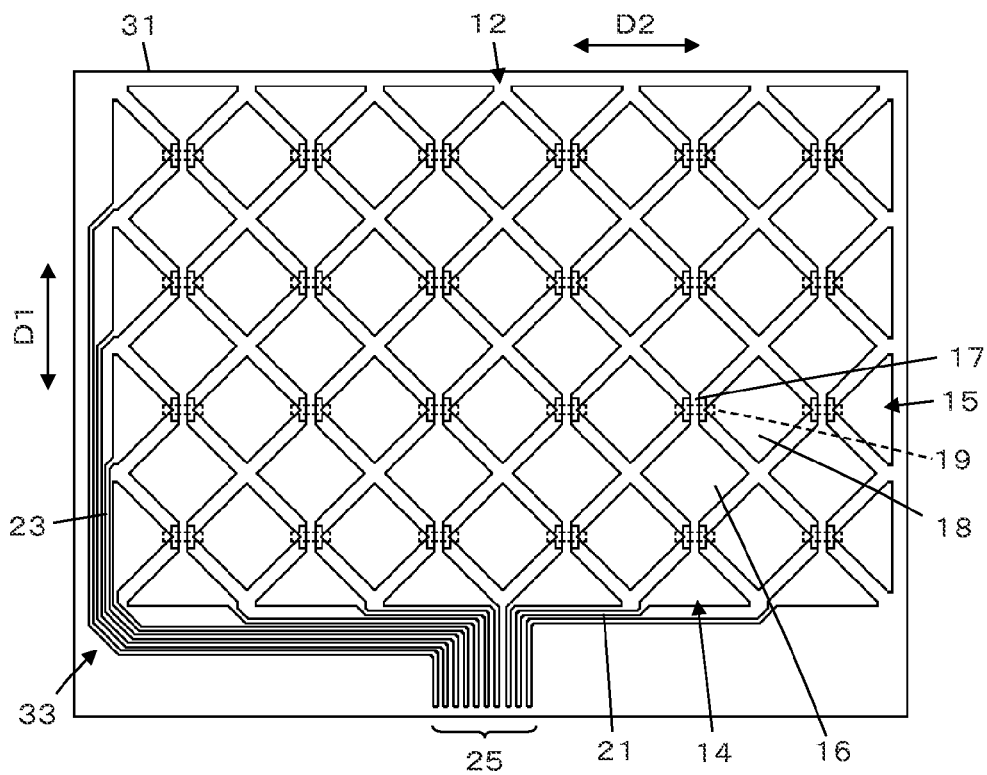
FIG. 8 is a plan view of a touch panel according to Embodiment 2.

A touch panel according to Embodiment 2 is illustrated in FIG. 8. In the touch panel, a sensor electrode portion 12 and a lead-out wiring portion 33 are formed on a transparent substrate 31. Although not shown, a transparent protection layer is formed over the sensor electrode portion 12 and the lead-out wiring portion 33, similarly to the touch panel according to Embodiment 1.

The sensor electrode portion 12 is same as the sensor electrode portion 12 used in the touch panel according to Embodiment 1.

The lead-out wiring portion 33 includes a first wiring portion 21 connected to one end of each of first sensor electrode arrays 14 extending along a first direction D1 and a second wiring portion 23 connected to one end of each of second sensor electrode arrays 15 extending along a second direction D2, and the first wiring portion 21 and the second wiring portion 23 run to reach a terminal region 25.

A plurality of first island-shaped electrode portions 16 of each of the first sensor electrode arrays 14 are electrically connected through a plurality of connecting portions 17, while a plurality of second island-shaped electrode portions 18 of each of the second sensor electrode arrays 15 are electrically connected through a plurality of jumper wiring portions 19. Accordingly, even when only one end of the first sensor electrode array 14 and one end of the second sensor electrode array 15 are respectively connected to the first wiring portion 21 and the second wiring portion 23 as in this Embodiment 2, it is possible to detect a change in capacitance over the entire sensor electrode portion 12.

However, if disconnection occurs at any one of the connecting portions 17 of the first sensor electrode arrays 14 or at any one of the jumper wiring portions 19 corresponding to the second sensor electrode arrays 15, it would no longer be possible to detect a change in capacitance in a part of the sensor electrode portion 12 from the point of disconnection to an end of the sensor electrode portion 12 to which the first wiring portion 21 or the second wiring portion 23 is not connected.

In this regard, since opposite ends of each of the first sensor electrode arrays 14 are respectively connected to the first wiring portions 21 and 22 while opposite ends of each of the second sensor electrode arrays 15 are also respectively connected to the second wiring portions 23 and 24 in the touch panel according to Embodiment 1 as illustrated in FIG. 1, even when disconnection occurs at one of the connecting portions 17 of the first sensor electrode arrays 14 or at one of the jumper wiring portions 19 corresponding to the second sensor electrode arrays 15, it is possible to detect a change in capacitance over the entire sensor electrode portion 12. Therefore, it is preferable that opposite ends of each of the first sensor electrode arrays 14 are respectively connected to the first wiring portions 21 and 22 and that opposite ends of each of the second sensor electrode arrays 15 are respectively connected to the second wiring portions 23 and 24, as in the lead-out wiring portion 13 in the touch panel according to Embodiment 1.

Embodiment 3

Figure 9:
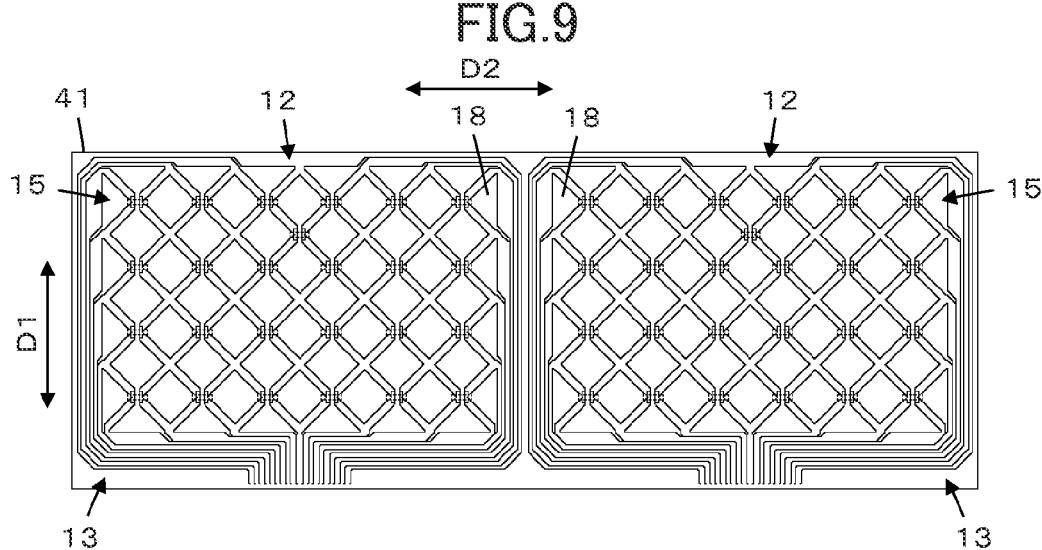
FIG. 9 is a plan view of a touch panel according to Embodiment 3.

In the touch panel according to Embodiment 1, a single sensor electrode portion 12 and a single lead-out wiring portion 13 are formed on the transparent substrate 11. However, two sensor electrode portions 12 and two lead-out wiring portions 13 corresponding to the two sensor electrode portions 12 can be formed on a single transparent substrate 41 as illustrated in FIG. 9.

While a part of the lead-out wiring portion 13 is arranged between the two sensor electrode portions 12, as the lead-out wiring portion 13 is formed of the third transparent conductor layer, the part between the two sensor electrode portions 12 does not need to be masked, and the entire area of the transparent substrate 41 can be a display region of a display device to be used in combination with a touch panel.

On the other hand, in a conventional touch panel using a metal wiring, the metal wiring could not be arranged between two sensor electrode portions 12 since any opaque part should not be formed in a display region.

When the number of first island-shaped electrode portions 16 of the first sensor electrode arrays 14 and the number of second island-shaped electrode portions 18 of the second sensor electrode arrays 15 are increased in order to maintain the detection resolution of a touch panel or to prevent the detection resolution from lowering as the screen increases in size, the number of wirings in the lead-out wiring portion 13 is also increased. In the meantime, an integrated circuit for detecting a change in capacitance to detect a contact position and switching between on and off often has a limitation in the number of wirings to accept.

However, in the touch panel according to Embodiment 3, since the two sensor electrode portions 12 and the two lead-out wiring portions 13 corresponding to the two sensor electrode portions 12 are arranged, the two lead-out wiring portions 13 are separately connected to integrated circuits, so that the touch panel can be divided into two areas to be operated, readily achieving enlargement of the screen size.

In addition, as described above regarding Embodiment 1, each of the first island-shaped electrode portions 16 located at both ends of each of the first sensor electrode arrays 14 and each of the second island-shaped electrode portions 18 located at both ends of each of the second sensor electrode arrays 15 in the sensor electrode portion 12 has an isosceles triangle shape which is a bisection of a rhombic shape. Accordingly, when two sensor electrode portions 12 are arranged side by side along the second direction D2 as illustrated in FIG. 9, the second island-shaped electrode portion 18 having an isosceles triangle shape at an end of each of the second sensor electrode arrays 15 in one of the two sensor electrode portions 12 comes close to the corresponding second island-shaped electrode portion 18 having an isosceles triangle shape at an end of each of the second sensor electrode arrays 15 in the other sensor electrode portion 12, whereby they can together function as one second island-shaped electrode portion 18 having a rhombic shape.

Similarly, three or more sensor electrode portions 12 and three or more lead-out wiring portions 13 corresponding thereto can be arrayed on a single transparent substrate. The array direction is also not limited to the second direction D2 as illustrated in FIG. 9, but a plurality of sensor electrode portions 12 and a plurality of lead-out wiring portions 13 can be arrayed along the first direction D1 and, moreover, can be arrayed both along the first direction D1 and the second direction D2, whereby enlargement of the screen size can be achieved.

Figure 10:
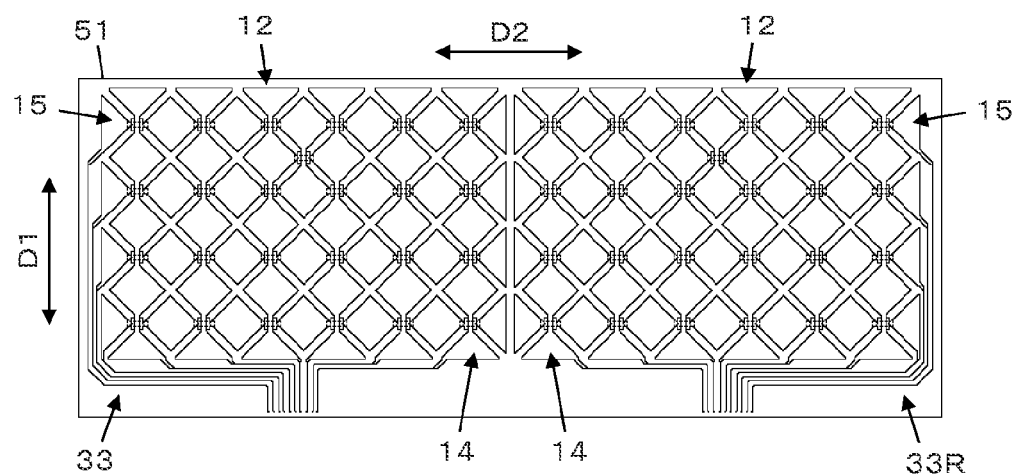
FIG. 10 is a plan view of a touch panel according to a modification of Embodiment 3.

Moreover, as illustrated in FIG. 10, two sensor electrode portions 12 can be arranged on a single transparent substrate 51, while a lead-out wiring portion 33 used in Embodiment 2 can be arranged around one of the two sensor electrode portions 12, and a lead-out wiring portion 33R that is formed to be symmetrical to the lead-out wiring portion 33 can be arranged around the other sensor electrode portion 12.

Since the lead-out wiring portions 33 and 33R are each connected to only one end of each of the first sensor electrode arrays 14 and one end of each of the second sensor electrode arrays 15, as the other ends of the second sensor electrode arrays 15 in the respective sensor electrode portions 12 to which the lead-out wiring portions 33 and 33R are not connected are arranged close to each other, a touch panel in which the lead-out wiring portions 33 and 33R are absent between the two sensor electrode portions 12, as illustrated in FIG. 10, can be constituted.

Accordingly, even when a metal wiring is used in the lead-out wiring portions 33 and 33R like in a conventional touch panel, no opaque part would be formed in the display region.

Figure 11:
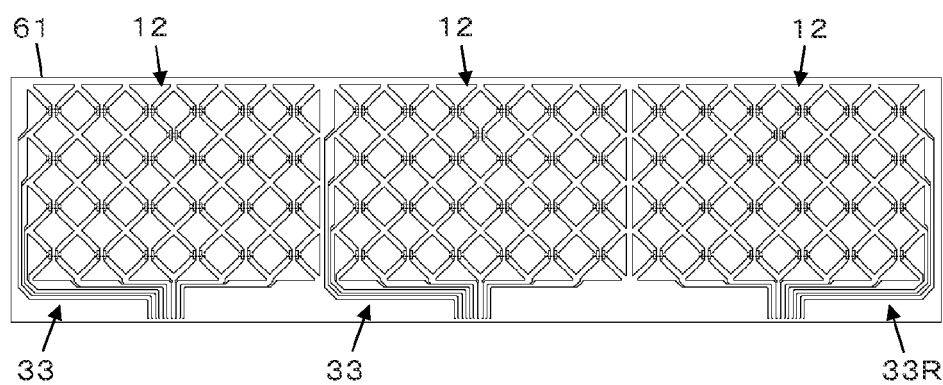
FIG. 11 is a plan view of a touch panel according to another modification of Embodiment 3.
Figure 12:
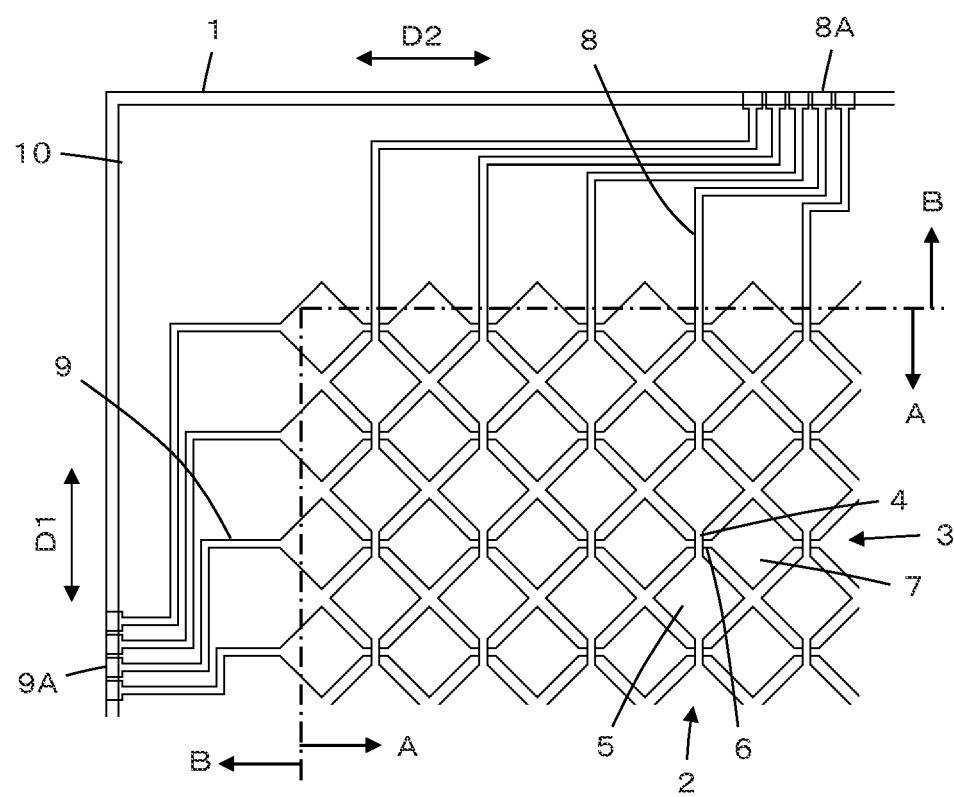
FIG. 12 is a partial plan view of a conventional touch panel.

However, when three or more sensor electrode portions 12 and three or more lead-out wiring portions 33 and 33R corresponding thereto are arrayed on a single transparent substrate as illustrated in FIG. 11, a part of the lead-out wiring portions 33 and 33R must be arranged between adjacent sensor electrode portions 12. Therefore, although a lead-out wiring portion formed of a metal wiring cannot be used to constitute a touch panel having such array as illustrated in FIG. 11, since the lead-out wiring portions 33 and 33R are transparent, three or more sensor electrode portions 12 can be arrayed, whereby enlargement of the screen size can be promoted.

What is claimed is:

1. A touch panel comprising:
  a transparent substrate;
  one or more sensor electrode portions formed on a surface of the transparent substrate; and
  one or more lead-out wiring portions formed around the sensor electrode portion on the surface of the transparent substrate and connected to the sensor electrode portion,
  wherein the sensor electrode portion includes:
  a plurality of first sensor electrode arrays in each of which a plurality of first island-shaped electrode portions are arrayed along a first direction and connected through connecting portions, the plurality of first sensor electrode arrays being arranged parallel to one another along a second direction that crosses the first direction;
  a plurality of second sensor electrode arrays in each of which a plurality of second island-shaped electrode portions are arrayed at intervals along the second direction, the plurality of second sensor electrode arrays being arranged parallel to one another along the first direction; and
  a plurality of jumper wiring portions which are arranged such that the plurality of jumper wiring portions and the corresponding connecting portions are superimposed through insulating portions, the plurality of jumper wiring portions electrically connecting the second island-shaped electrode portions arranged adjacent to each other along the second direction,
  wherein the lead-out wiring portion includes:
  a plurality of first wiring portions connected to the plurality of first sensor electrode arrays of the sensor electrode portion, respectively; and
  a plurality of second wiring portions connected to the plurality of second sensor electrode arrays of the sensor electrode portion, respectively,
  wherein the plurality of first sensor electrode arrays and the plurality of second sensor electrode arrays of the sensor electrode portion are formed of a first transparent conductor layer having a first thickness,
  wherein the plurality of jumper wiring portions of the sensor electrode portion are formed of a second transparent conductor layer having a second thickness, and
  wherein the lead-out wiring portion is formed of a third transparent conductor layer having a two-layer structure in which a first lead-out wiring layer of the second thickness having a predetermined pattern shape and a second lead-out wiring layer of the first thickness having the predetermined pattern shape are in contact with each other and superimposed on each other.

2. The touch panel according to claim 1, wherein the second thickness is larger than the first thickness.

3. The touch panel according to claim 1, wherein the jumper wiring portions, the insulating portions and the connecting portions are formed on the surface of the transparent substrate in this order.

4. The touch panel according to claim 1, wherein the lead-out wiring portion includes a pair of the first wiring portions respectively connected to opposite ends of each of the first sensor electrode arrays in the first direction and a pair of the second wiring portions respectively connected to opposite ends of each of the second sensor electrode arrays in the second direction.

5. The touch panel according to claim 1, wherein a plurality of the sensor electrode portions and a plurality of the lead-out wiring portions respectively corresponding to the plurality of the sensor electrode portions are formed on the transparent substrate.

6. The touch panel according to claim 5, wherein a part of the lead-out wiring portion is disposed between the sensor electrode portions that are adjacent to each other.

7. The touch panel according to claim 1, further comprising a transparent protection layer that covers the sensor electrode portion and the lead-out wiring portion.

8. The touch panel according to claim 1, wherein the first transparent conductor layer, the second transparent conductor layer and the third transparent conductor layer are formed of indium tin oxide.

9. A touch panel production method of producing the touch panel according to claim 1, comprising:
  a first pattern forming step of forming a first transparent conductor pattern including the plurality of jumper wiring portions and the first lead-out wiring layer having the predetermined pattern shape on the transparent substrate;
  a second pattern forming step of forming a second transparent conductor pattern including the plurality of first sensor electrode arrays, the plurality of second sensor electrode arrays and the second lead-out wiring layer having the predetermined pattern shape on the transparent substrate; and
  an insulating portion forming step of forming the insulating portions to insulate the jumper wiring portions and the connecting portions from each other, the jumper wiring portions and the connecting portions being superimposed,
  wherein the first pattern forming step, the second pattern forming step and the insulating portion forming step are performed such that the jumper wiring portions and the connecting portions are superimposed through the insulating portions and that the first lead-out wiring layer and the second lead-out wiring layer are superimposed, whereby the second island-shaped electrode portions that are adjacent to each other along the second direction are electrically connected by the jumper wiring portions to form the sensor electrode portion, and the first lead-out wiring layer and the second lead-out wiring layer are superimposed to form the lead-out wiring portion.

10. The touch panel production method according to claim 9, wherein the insulating portion forming step is performed between the first pattern forming step and the second pattern forming step.

11. The touch panel production method according to claim 10, wherein the first pattern forming step, the insulating portion forming step and the second pattern forming step are performed in this order.

12. The touch panel production method according to claim 9, wherein the first transparent conductor pattern is formed to be thicker than the second transparent conductor pattern.

13. The touch panel production method according to claim 9, further comprising a protection layer forming step of forming a transparent protection layer that covers the sensor electrode portion and the lead-out wiring portion.

* * * * *